US010645906B2

(12) United States Patent
Komatsubara

(10) Patent No.: US 10,645,906 B2
(45) Date of Patent: May 12, 2020

(54) ABSORBENT ARTICLE FOR PET

(71) Applicant: Unicharm Corporation, Shikokuchuo-shi, Ehime (JP)

(72) Inventor: Daisuke Komatsubara, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 317 days.

(21) Appl. No.: 15/517,508

(22) PCT Filed: Dec. 12, 2014

(86) PCT No.: PCT/JP2014/082919
§ 371 (c)(1),
(2) Date: Apr. 6, 2017

(87) PCT Pub. No.: WO2016/075841
PCT Pub. Date: May 19, 2016

(65) Prior Publication Data
US 2017/0303512 A1   Oct. 26, 2017

(30) Foreign Application Priority Data

Nov. 14, 2014  (JP) .................................. 2014-231669

(51) Int. Cl.
*A01K 23/00*       (2006.01)
(52) U.S. Cl.
CPC .................................... *A01K 23/00* (2013.01)
(58) Field of Classification Search
CPC ...................................................... A01K 23/00
See application file for complete search history.

(56) References Cited

U.S. PATENT DOCUMENTS 5,146,874 A * 9/1992 Vidal ..................... A01K 23/00
119/868
5,954,015 A * 9/1999 Ohta ..................... A01K 23/00
119/850

(Continued)

FOREIGN PATENT DOCUMENTS

| JP | 7-236380 A | 9/1995 |
| JP | 3176632 U | 6/2012 |
| JP | 5576002 B1 | 8/2014 |

OTHER PUBLICATIONS

International Search Report in PCT/JP2014/082919, dated Jan. 13, 2015.

*Primary Examiner* — Jessica B Wong
(74) *Attorney, Agent, or Firm* — Hauptman Ham, LLP

(57) ABSTRACT

An absorbent article has a longitudinal direction and a lateral direction orthogonal to the longitudinal direction and includes: a belly facing region, a back facing region, an intermediate region positioned between the belly facing region and the back facing region in the longitudinal direction, and an absorbent member including an absorbent core. The absorbent member is only disposed in a portion closer to the belly facing region than a cut line in which the tail of a pet is inserted, and includes: both absorbent side edges opposite to each other in the lateral direction, a first absorbent portion facing a urine opening of the pet, and a second absorbent portion facing a portion outside the urine opening, and the absorbent core includes an first narrow portion (interruption portion) configured to interrupt linkage between the first absorbent portion and the second absorbent portion in the longitudinal direction.

6 Claims, 14 Drawing Sheets

(56) References Cited

U.S. PATENT DOCUMENTS

2005/0154367 A1* 7/2005 Ikegami ............... A01K 23/00
604/389
2010/0229803 A1 9/2010 Meissner et al.

* cited by examiner

ABSORBENT ARTICLE FOR PET

RELATED APPLICATIONS

The present application is a National Phase of International Application Number PCT/JP2014/082919, filed Dec. 12, 2014, which claims priority to Japanese Application Number 2014-231669, filed Nov. 14, 2014.

TECHNICAL FIELD

The present disclosure relates to an absorbent article for absorbing urine or other excretions of pets such as dogs and cats.

BACKGROUND ART

Absorbent articles for pets to be worn on the body of pets, such as cats and dogs, have conventionally been known. For example, PTL 1 discloses an absorbent article for pets that includes an absorbent member (liquid absorbent pad) including: a belly facing region; a back facing region; and an absorbent core.

CITATION LIST

Patent Literature

PTL 1: Japanese Unexamined Patent Application Publication No. 7-236380 (JP7-236380)

SUMMARY OF INVENTION

Technical Problem

In the absorbent article disclosed in PTL 1, the absorbent member has a rectangular shape elongated in the longitudinal direction, and an area positioned at an end portion of the absorbent member and faces a urine opening of a male pet continues to a non-facing area that is between the thighs of the hind legs and does not face the urine opening. The absorbent article might be displaced by the movement of pet facing area under the movement of the thighs. Such an instance involves not only the risk that the absorbent article might be displaced but also involves a risk that the facing area might move into a movable range of the hind legs to interfere with the walking.

An object of the present invention is to provide an absorbent article as an improvement of conventional absorbent articles for a pet for enabling the hind legs to be moved without causing the risk of the displacement or being prevented.

Solution to Problem

The present invention is directed to an absorbent article for a pet having a longitudinal direction and a lateral direction orthogonal to the longitudinal direction and including: a belly facing region, a back facing region, an intermediate region positioned between the belly facing region and the back facing region in the longitudinal direction, and an absorbent member including an absorbent core.

In the absorbent article for a pet according to the present invention, the absorbent member is only disposed in a portion closer to the belly facing region than a cut line in which the tail of the pet is inserted, and includes: both side edges opposite to each other in the lateral direction, a first absorbent portion facing a urine opening of the pet, and a second absorbent portion facing a portion outside the urine opening, and the absorbent core includes an interruption portion configured to interrupt linkage between the first absorbent portion and the second absorbent portion in the longitudinal direction.

Advantageous Effects of Invention

In the absorbent article for a pet according to at least one embodiment of the present invention, the absorbent member includes the first absorbent portion facing an urine opening of the pet, the second absorbent portion facing a portion outside the urine opening, and the absorbent core including the severance portion configured to sever linkage between the first absorbent portion and the second absorbent portion in the longitudinal direction. Thus, the front-and-rear movement of the hind legs involves a portion including the first absorbent portion and a portion including the second absorbent portion moving independently from each other. Thus, the absorbent core is prevented from the movement of the hind legs of the pet, while preventing the displacement of the absorbent member.

BRIEF DESCRIPTION OF DRAWINGS

The drawings illustrate specific embodiments of the present invention including optional and preferred embodiments as well as essential features of the invention.

DESCRIPTION OF EMBODIMENTS

Figure 1:
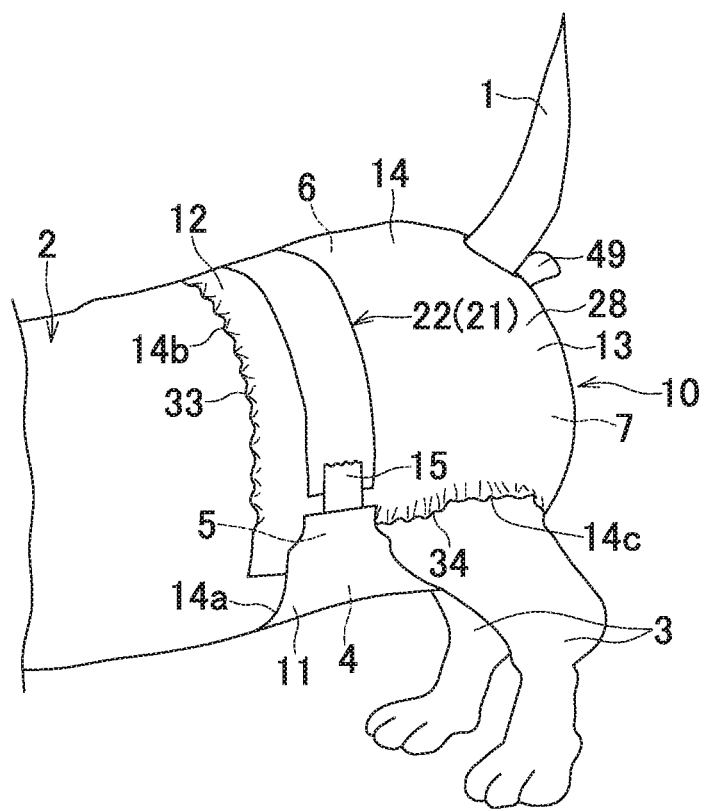
FIG. 1 is a perspective view of an absorbent article for pets according to a first embodiment of the present invention in a worn state.

The embodiments described below relate to an absorbent article for pets illustrated in FIGS. 1 to 14 including both optional and preferred features as well as these features which are essential features of the present invention.

First Embodiment

As illustrated in FIGS. 1 to 4, an absorbent article (a diaper) 10 worn by a pet 2 have a longitudinal direction Y and a lateral direction X, and includes: a body facing surface (inner surface) facing the body of the pet 2 and a non-body facing surface (outer surface) on the opposite side; an absorbent panel 14 including a belly facing region 11, a back facing region 12, and an intermediate region 13 positioned between the belly facing region 11 and the back facing region 12 in the longitudinal direction Y; and a pair of fastening tabs 15 forming a fastening system extending outward in the lateral direction X from both side edges 14c of the belly facing region 11. The belly facing region 11 covers a belly portion 4 and a hip portion 5 positioned on the forward side of the hind legs 3 of the pet 2. The back facing region 12 is an area covering a back portion and the hip portion 5 positioned on the forward side of the hind legs 3 of the pet 2. The intermediate region 13 entirely covers a buttocks 7 including a region between the thighs of the hind legs 3. An absorbent member 50, for absorbing excursion such as urine, is partially disposed in the belly facing region 11 and in the intermediate region 13. The absorbent article 10 has a longitudinal center line P bisecting the length in the lateral direction X, and a lateral center line Q bisecting the length in the longitudinal direction Y.

The fastening tabs 15 each have the body facing surface provided with a first fastening element 20 including a group of hooks of a mechanical fastener. The back facing region 12 has an outer surface on which a landing portion 22, for detachably attaching the first fastening element 20, is attached with hot-melt adhesive (not illustrated) for example. The landing portion 22 includes a second fastening element 19 including a group of loops of the mechanical fastener extending in the lateral direction X.

<Absorbent Panel>

The absorbent panel 14 has a contour defined by: first and second end edges 14a and 14b on opposite sides in the longitudinal direction Y and extend in the lateral direction X; and both side edges (leg opening edges) 14c with a curved form that are positioned between the first and the second end edges 14a and 14b and extend in the longitudinal direction Y. Both side edges 14c in the intermediate region 13 include: a pair of first inwardly curved portions 19a curved inward in the lateral direction X from inner ends 11a of the belly facing region 11; a pair of second inwardly curved portions 19b curved inward in the in the lateral direction X from inner ends 12a of the back facing region 12; and a pair of straight portions 19c positioned between the first inwardly curved portions 19a and the second inwardly curved portions 19b.

The absorbent panel 14 includes: a liquid permeable inner layer sheet (inner layer) 22 positioned on a body facing surface side and includes a fiber nonwoven fabric, porous plastic film, or a laminate sheet including these; a liquid impermeable outer layer sheet (outer layer) 28 positioned on the non-body side facing surface side and includes a breathable plastic film, fiber nonwoven fabrics, or a laminate sheet of these; and an absorbent member 50 provided between the inner and the outer layer sheets 27 and 28. The inner layer sheet 27 and the outer layer sheet 28 extend from outer circumference edges of the absorbent member 50, and have the extended portions bonded to each other with hot-melt adhesive (not illustrated) applied on the inner surface of at least one of the sheets 27 and 28.

Figure 2:
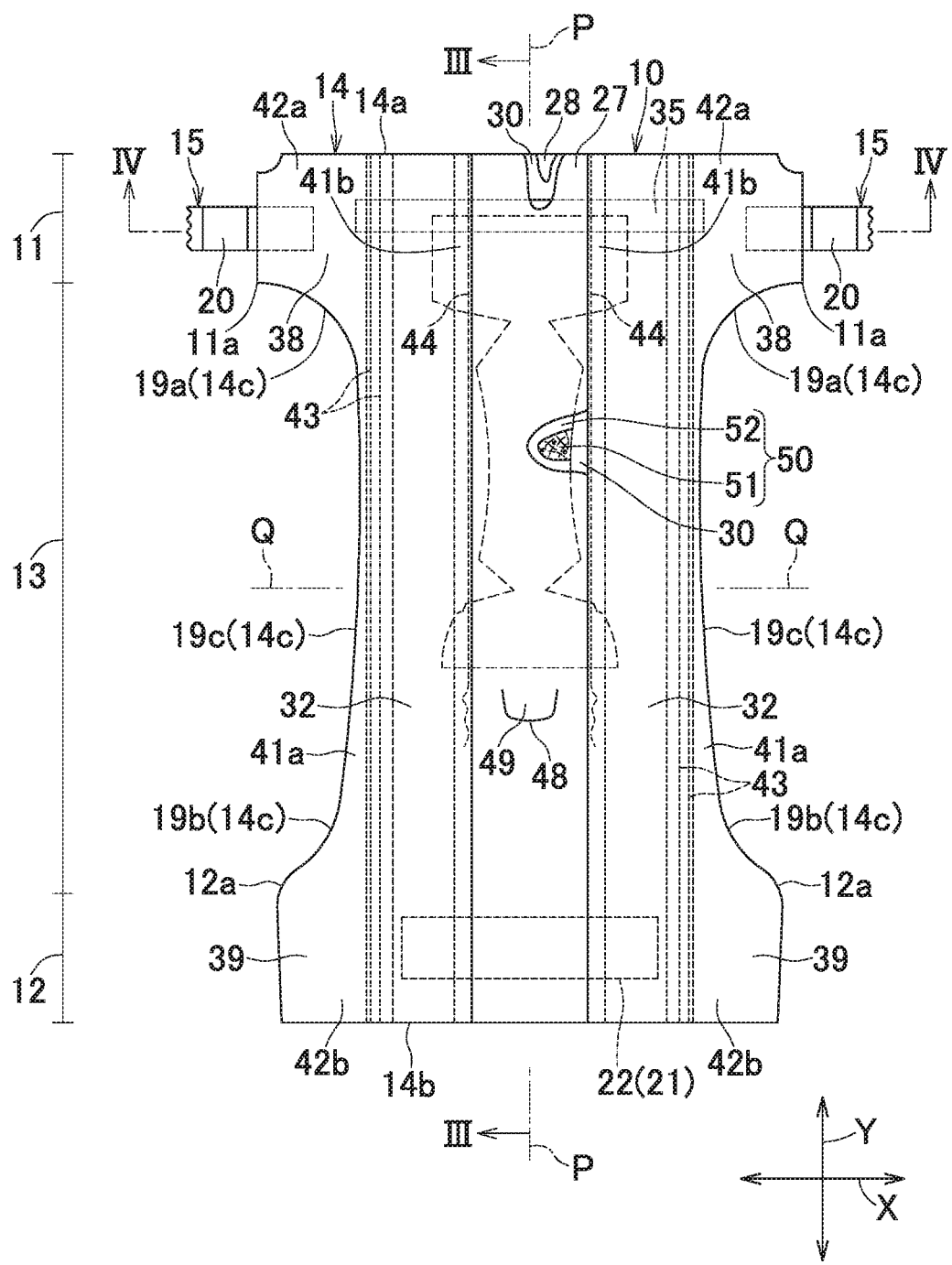
FIG. 2 is a partially cutaway development plan view of the absorbent article extended in a longitudinal direction and a lateral direction until each elastic member is extended to the maximum (such that gathering caused by the contraction effect of the elastic material is straightened out).
Figure 6:
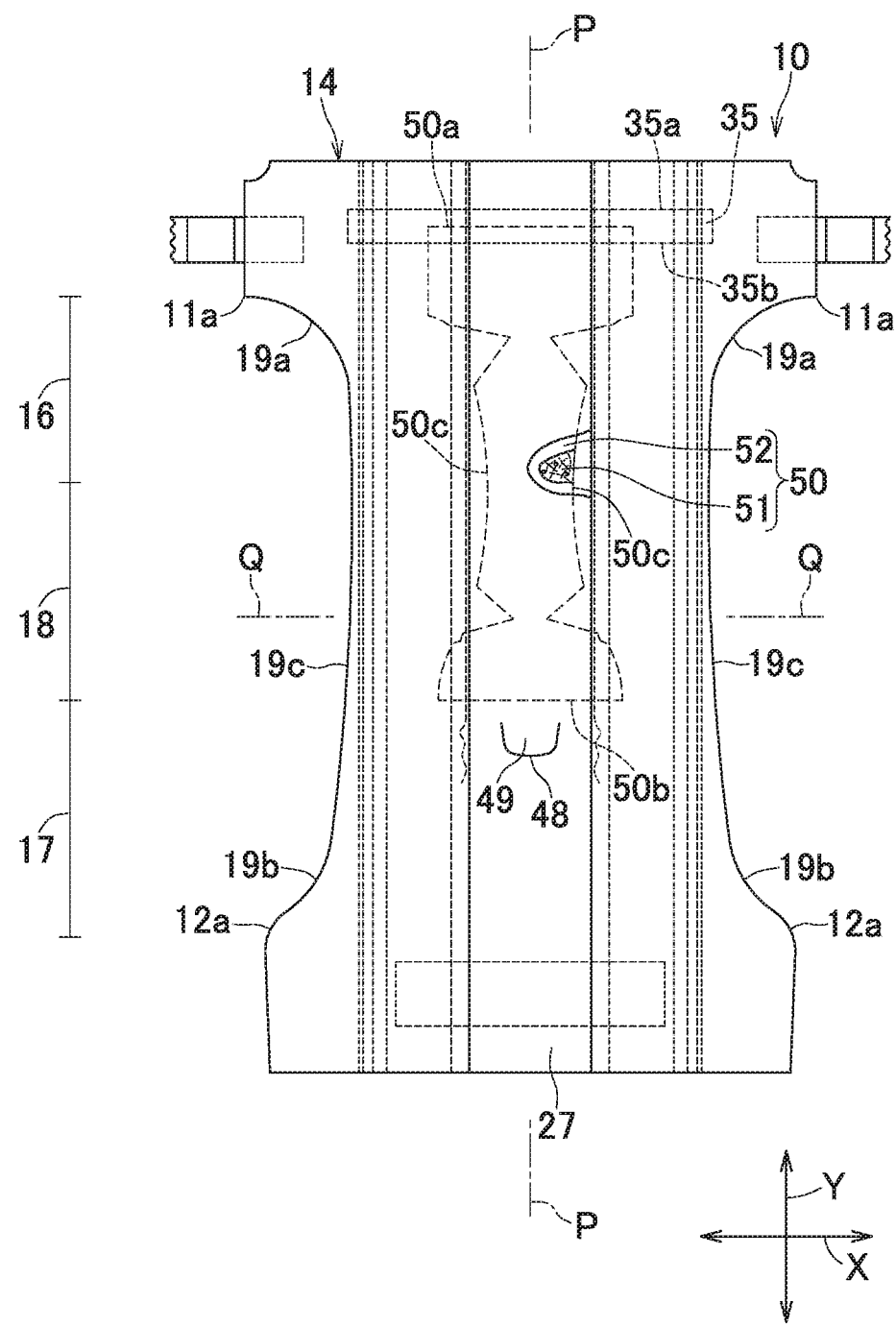
FIG. 6 is a partially cutaway development plan view illustrating an intermediate region of an absorbent member, in the absorbent article illustrated in FIG. 2, in detail.

As illustrated in FIG. 2 and FIG. 6, for the sake of description, the intermediate region 13 is divided into: a first region 16 that is positioned on the side of the belly facing region 11, includes the first inwardly curved portion 19a, and extends toward the lateral center line Q from the inner ends 11a of the belly facing region 11; a second region that is positioned on the side of the back facing region 12, includes the second inwardly curved portion 19b, and extends toward the lateral center line Q from the inner ends 12a of the back facing region 12; and a third region 18 positioned between the first and the second regions 16 and 17. The absorbent member 50 is positioned in the first region 16 and the center region 18 in the belly facing region 11 and the intermediate region 13. The second region 17 is positioned between the inner ends 12a of the back facing region 12 and a second end edge 50b of the absorbent member 50 described later. In the intermediate region 13, the first region 16, the second region 17, and the third region 18 may be defined by equally dividing the length of the intermediate region 13 in the longitudinal direction Y in three, for example. Alternatively, one of the length of the first and the second regions 16 and 17 in the longitudinal direction Y and the length of the center region 18 in the longitudinal direction Y may be larger than the other.

Referring to FIGS. 1 to 4, a leakage barrier sheet 30, including a liquid-impermeable and breathable plastic film, is disposed on anon-body facing surface side of the liquid absorbent layer 50 between the inner layer sheet 27 and the outer layer sheet 238, and is fixed with hot-melt adhesive applied on the inner surface of at least one of the sheets 27 and 28. A pair of flap sheets 32 are positioned symmetrically about the longitudinal center line P, on an outer side of the absorbent member 50 in the lateral direction X in the body side facing surface of the inner layer sheet 27.

When the absorbent article 10 is worn by the pet 2, a waist opening 33 and a pair of leg openings 34 are defined with the first fastening element 20 of the pair of fastening tab 15 engaged with the second fastening element 21 on the second outer surface of the back facing region 12 (see FIG. 1).

Figure 3:
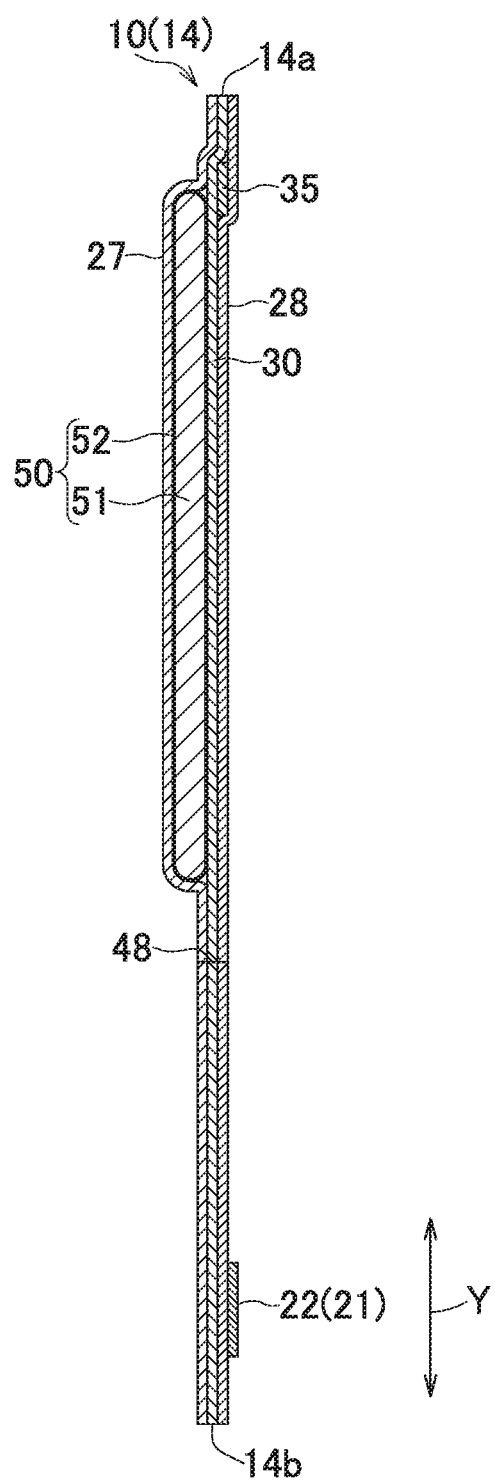
FIG. 3 is a schematic cross-section view along line in FIG. 2.

As illustrated in FIG. 2 and FIG. 3, a belly-side ribbon elastic member (belly-side elastic element) 35 in a strip form is attached to the belly facing region 11 of the absorbent panel 14 and extends in the lateral direction X between the outer layer sheet 28 and the leakage barrier sheet 30. The belly-side ribbon elastic member 35 is formed of a rubber thread, a flat rubber/urethane foam, or a ribbon made of natural or synthetic rubber or polyurethane foam, and is a flat elastic made of polyurethane foam in the present embodiment. The belly-side ribbon elastic member 35 preferably has a predetermined width (the length in the longitudinal direction Y) and a predetermined length (the length in the lateral direction X) to fit the body of the pet 2 while applying contractile force over a relatively large area of the belly facing region 11. As illustrated in FIG. 3 and FIG. 6, the absorbent member 50 has a first edge 50a positioned in the belly facing region 11 and is disposed between both end edges 35a and 35b of the belly-side ribbon elastic member 35 in the longitudinal direction Y.

Figure 4:
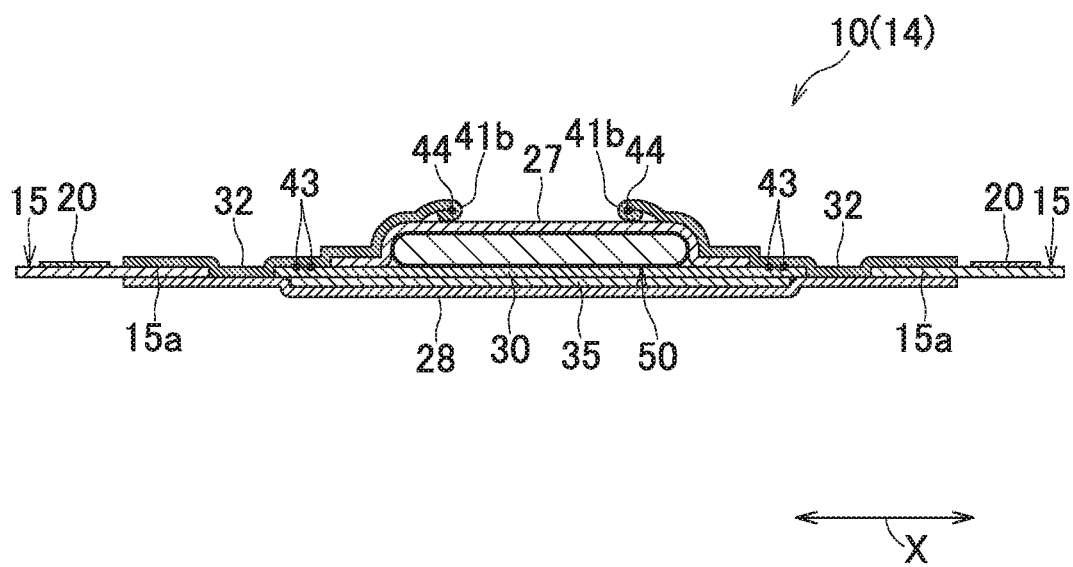
FIG. 4 is a schematic cross-section view along line IV-IV in FIG. 2.

As illustrated in FIGS. 2 and 4, the outer layer sheet 28 and the flap sheet 32 extend outward in the lateral direction X beyond both side edges of the inner layer sheet 27 and the leakage barrier sheet 30 in the belly and the back facing regions 11 and 12. The extended portions overlap with each other to form a belly side flap 38 and a back side flap 39. Both side edge portions of the outer layer sheet 28 and the flap sheet 32, forming the belly side flap 38, have proximal portions 15a of the pair of fastening tabs 15 fixed integrally therebetween with, for example, hot-melt adhesive (not illustrated) applied on the inner surfaces of the sheets 28 and 32. The fastening tab 15 includes a base material sheet preferably formed of a sheet material with relatively high rigidity and tensile strength such as a plastic sheet, a fiber nonwoven fabric, a laminate of these, or craft paper.

Figure 5:
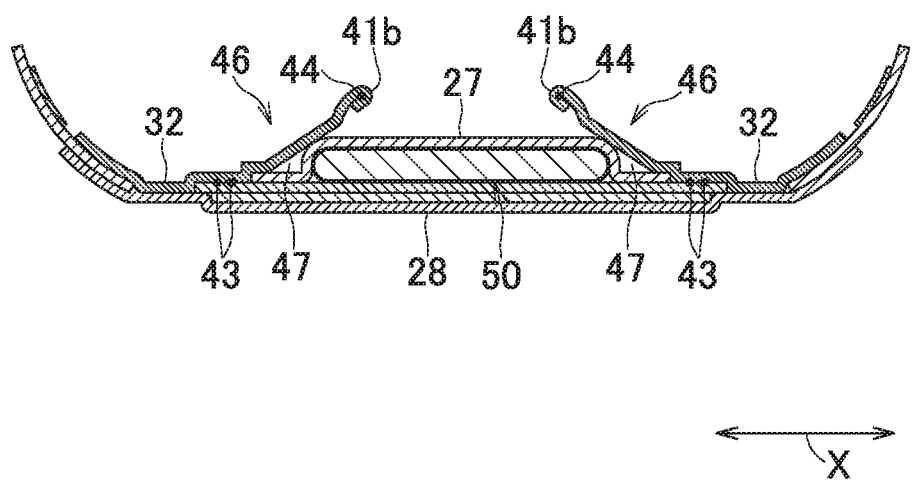
FIG. 5 is a schematic cross-section view illustrated in a portion illustrated in FIG. 4 in a state where the absorbent article is worn.

The flap sheet 32 includes: proximal portions 41a forming part of both side edges 14c; forward end fixing members (fixing member) 42a and rear end fixing members 42b fixed to body side facing surfaces of the inner layer sheet 27 and the outer layer sheet 28 in the belly and the back facing regions 11 and 12; and distal portions 41b that are formed by folding the inner side edges of the flap sheet 32 inward, and extend in the longitudinal direction Y between the front and the rear end fixing members 42a and 42b. On both side edges of the leakage barrier sheet 30 in the lateral direction X, side elastic members (side elastic elements) 43, in a form of two strands and strings extending in the longitudinal direction Y, are each attached contractibly between the proximal portion 41a of the flap sheet 32 and a corresponding one of both side portions of the leakage barrier sheet 30, with hot-melt adhesive (not illustrated). A flap elastic member (flap elastic element) 44, in a form of one or a plurality of strands or strings extending in the longitudinal direction Y for example, is attached to each of the proximal portions 41b of the flap sheet 32, in a stretched state and contractibly. FIG. 5 is a schematic cross-section view of the belly facing region 11 in the absorbent article 10 worn by the pet 2. The distal portions 41b are spaced away from the body side facing surface of the inner layer sheet 27 under the contracting effect of the flap elastic member 44. Thus, a pair of containment flaps 46 and space portions 47 between the containment flap 46 and the inner layer sheet 27, are formed to prevent the excretion from leaking in the lateral direction X.

In the present embodiment, the side elastic member 43 and the flap elastic member 44 are each an elastic string or strand material, with a fineness of 280 to 500 dtex, attached contractibly while being stretched to be 2.0 to 3.0 (preferably, 2.2 to 2.5) times longer than the original length, for example. The number of elastic members 43 and 44 may be increased or a space (pitch) between a plurality of elastic members may be appropriately set on the basis of the contractile force required for each of the elastic members 43 and 44. The elastic materials forming the elastic members 43 and 44 may have the fineness and the stretch magnification different from one another instead of being uniform. Specifically, for example, one of a plurality of elastic materials forming the side elastic member 43 on an outermost side in the lateral direction X may have a higher fineness than the elastic materials on the inner side in the lateral direction X. Alternatively, the former may have a smaller fineness than the latter. Furthermore, the fineness or the stretch magnification of the elastic materials may increase (or decrease) toward the outer side from the inner side in the lateral direction X.

For example, the side elastic member 43 continuously extends in the longitudinal direction Y entirely over the absorbent panel 14, that is, between the first end edge 14a and the second end edge 14b. The flap elastic members 44 extend toward the from the first end edge 14a beyond the absorbent member 50. The side elastic member 43 and the flap elastic member 44 each include: an extending-contracting function portion actually exerting flexibility; and a non-extending-contracting function portion actually exerting no flexibility. The non-extending-contracting function portion is formed through snapback (a non-fixed portion as a portion of the elastic members 43 and 44 not fixed contracts to return to a portion closed to a bonded end portion fixed to the sheet) when the elastic members 43 and 44 are attached to the sheet. The side elastic member 43 and the flap elastic member 44 have end portions overlapping both end portions of the belly-side ribbon elastic member 35 in plan view. The end portions are preferably the extending-contracting function portion actually exerting flexibility. Force of pulling the first end portion 14a of the absorbent panel 14 toward the back facing region 12 acts in the longitudinal direction Y under the contracting force of both elastic members 43 and 44. Thus, both side edges 14c are entirely in a tension state. Still, the absorbent article 10 maintains in a state of being open in the lateral direction X. All things considered, an operation of putting on the absorbent article 10 may be smoothly performed without large deformation when part of the absorbent article 10 provided through a region between the hind legs 3 of the pet 2.

Figure 8:
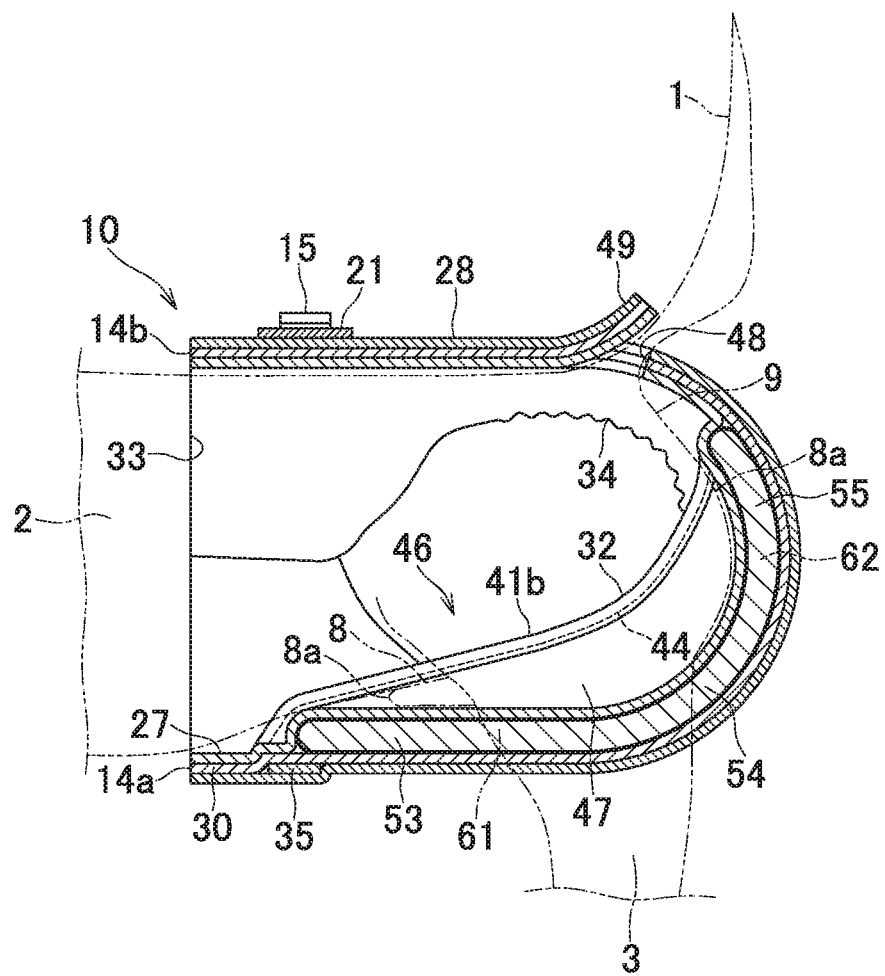
FIG. 8 is a schematic cross-section view of the absorbent article worn by a male pet, taken along the longitudinal center line.

As illustrated in FIG. 3 and FIG. 6, a cut line (perforation) 48, for forming the opening (insertion hole) in which a tail 1 of the pet 2 is inserted, is provided in the second region 17 of the intermediate region 13. The cut line 55 is formed through the inner layer sheet 22, the inner layer sheet 27, the leakage barrier sheet 30, and the outer layer sheet 28 overlapping each other in plan view. The opening, through which the tail 1 is inserted, is formed when the absorbent panel 14 is partially cut along the cut line 48 and a tongue piece 49 in a state where the sheets 27, 28, and 30 are bonded or not bonded is outwardly folded, as illustrated in FIG. 1 and FIG. 8.

With reference to FIG. 3 and FIG. 6, the absorbent member 50 includes: a semi-rigid absorbent core 51 positioned between the inner and the outer layer sheets 27 and 28; and a core wrap sheet 52 wrapping the absorbent core 51. The absorbent core 51 is made of a mixture containing particles of what is called high-absorbent polymer (SAP), which is water insoluble and has water absorbing power of at least ten times larger than its mass, wood fluff pulp, and a small amount of optional thermoplastic fibers. The core wrap sheet 52 is made of hydrophilic and liquid diffusive nonwoven fabrics or tissue paper. The absorbent member 50 is disposed only in a portion closer to the belly facing region 11 than the cutting line 48 in which the tail 1 of the pet is inserted. More specifically, with the absorbent member 50 positioned only in the portion closer to the belly facing region 11 than the cutting line 48 in which the tail 1 of the pet is inserted in the present invention, an element such as SAP particles and wood fluff pulp actually absorbing the excretion is positioned only in the portion closer to the belly facing region 11 than the cutting line 48 in which the tail 1 of the pet is inserted. Thus, the SAP particles and wood fluff pulp scattered toward the back facing region 12 beyond the cutting line 48 in a manufacturing process and the core wrap sheet 52 extended toward the back facing region 12 in the longitudinal direction Y are irrelevant. The core wrap sheet 52 is bonded to the inner layer sheet 27 and/or the leakage barrier sheet 30 with hot-melt adhesive, for example, and extends outward in the lateral direction X from the side edges of the absorbent core 51. The absorbent member 50 further includes the first end edge 50a and a second end edge 50b extending in the lateral direction X and are opposite to each other in the longitudinal direction Y and a both absorbent side edges (both side edges) 50c extending in the longitudinal direction Y and are opposite to each other in the lateral direction X.

Figure 7:
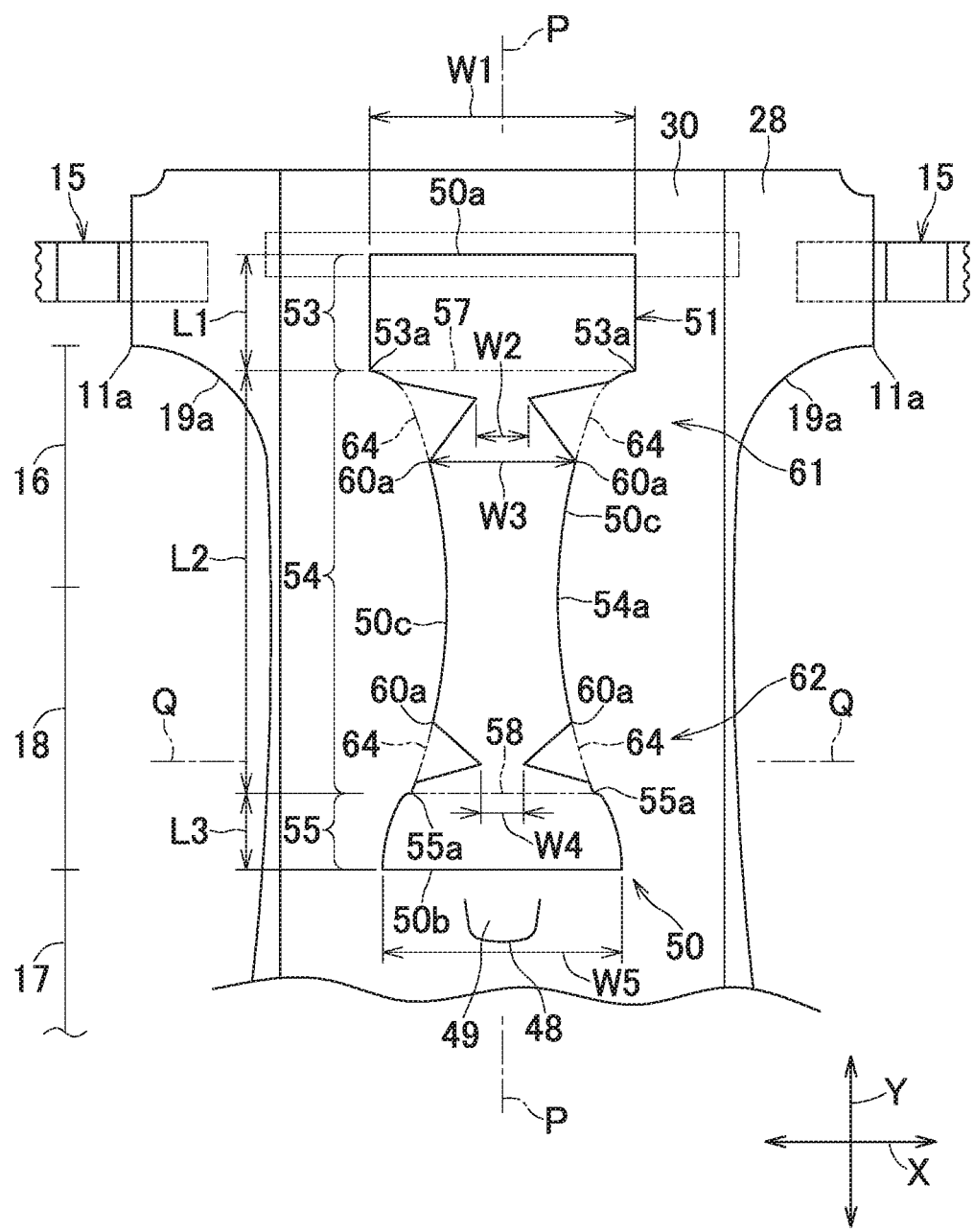
FIG. 7 is a schematic partial plan view as viewed from the body facing surface side illustrating a state where an inner layer sheet, a flap sheet, a core wrap sheet positioned on a skin facing side, side elastic members, and flap elastic members are removed from the absorbent article illustrated in FIG. 6.

FIG. 7 is a diagram similar to FIG. 2, and illustrates the belly facing region 11 and the intermediate region 13 as viewed from the body facing surface side, in a state where the inner layer sheet 27, the flap sheet 32, the core wrap sheet 52 positioned on the skin facing surface side, and the elastic members 43 and 44 are removed from the absorbent article 10.

The absorbent member 50 includes: a generally rectangular first absorbent portion 53 positioned in part of the belly facing region 11 and the first region 16 of the intermediate region 13; a second absorbent portion 54 extending toward the lateral center line Q from the first absorbent portion 53; and a third absorbent portion 55 positioned on a side of the back facing region 12 in the center region 18, arranged in the longitudinal direction Y. The first absorbent portion 53 and the third absorbent portion 55 have generally the same length in the lateral direction X. The first absorbent portion 53 has a length L1 in the longitudinal direction Y larger than a length L3 of the third absorbent portion 55 in the longitudinal direction Y. The second absorbent portion 54 has a length L2 in the longitudinal direction Y longer than the lengths L1 and L3 of the first and the third absorbent portions 53 and 55 in the longitudinal direction Y, and has a length in the lateral direction X shorter than the other portions to be relatively narrow. Specifically, a ratio L1:L2:L3=1:2:1 holds true among the length L1 of the first absorbent portion 53 in the longitudinal direction Y, the length L2 of the second absorbent portion 54 in the longitudinal direction Y, and the length L3 of the third absorbent portion 55 in the longitudinal direction Y. For the sake of description, FIG. 7 includes virtual lines (two dot chain lines) representing a first border line 57 between the first absorbent portion 53 and the second absorbent portion 54 and a second border line 58 between the second absorbent portion 54 and the third absorbent portion 55.

FIG. 8 is a schematic cross-section view taken along the longitudinal center line P, illustrating a state where the male pet 2 is wearing the absorbent article 10. As illustrated in FIG. 8, the first absorbent portion 53 faces a urine opening 8a of male genitalia 8 of the male pet 2 wearing the absorbent article 10. The second absorbent portion 54 faces a portion between the urine opening 8a and an anus 9 of the male pet 2 wearing the absorbent article 10. Thus, the second absorbent portion 54 faces a portion outside the urine opening 8a of the male pet 2. The third absorbent portion 55 faces a portion around the anus 9 of the pet 2.

As illustrated in FIG. 7, the second absorbent portion 54 includes: a center portion 54a; a first narrow portion (first interruption portion) 61 adjacent to the first absorbent portion 53 and is sharply narrowed toward the longitudinal center line P; a second narrow portion (second interruption portion) 62 adjacent to the third absorbent portion 55 in the longitudinal direction Y and is sharply narrowed toward the longitudinal center line P. The first narrow portion 61 extends to the first border line 57 of the first absorbent portion 53 from end edges 60a of both side edges 50c of the center portion 54a. The second narrow portion 62 extends to the second border line 58 for the third absorbent portion 55 from the end edges 60a of both side edges 50c of the center portion 54a. In this specification, "the first and the second interruption portions of the absorbent member" are portions (the first and the second narrow portions 61 and 62) of the absorbent member 50 with length in the lateral direction X locally reduced, for reducing the linkage over the entire absorbent member 50 involved in the movement of the pet 2. The portions may be obtained with both side edges 50c extending toward the longitudinal center line P with a shape other than that in the present embodiment, which is a sharp triangular shape, such as a slit or a recessed shape.

The first absorbent portion 53 faces the urine opening 8a and thus functions as a main absorbent portion directly absorbing the excreted urine. The second absorbent portion 54 is a sub-absorbent portion to which the excretion, absorbed in the first and the third absorbent portions 53 and 55, spreads (the third absorbent portion 55 is an absorbent portion facing the urine opening of the female pet 2 wearing the absorbent article 10 as described later). The absorbent member 50 has the largest width in the lateral direction X (the largest length in the lateral direction X) in the first and the third absorbent portions 53 and 55, and has the smallest width in the first and the second narrow portions 61 and 62 of the second absorbent portion 54. The center portion 54a of the second absorbent portion 54 is wider than the first and the second narrow portions 61 and 62. The first absorbent portion 53 functions as the main absorbent portion for absorbent the excretion, and thus is preferably relatively wide. The second absorbent portion 54 is positioned between both hind legs 3 of the pet 2, and thus is preferably narrower than the first absorbent portion 53 so as not to prevent the movement of the pet 2. Thus, the lengths of the absorbent member 50 are set to satisfy the following relationship: the length W1 of the first absorbent portion 53 in the lateral direction X≥the length W3 of the widest portion of the second absorbent portion 54 in the lateral direction X>the length W2 of the narrowest portion of the second absorbent portion 54 (the length of the narrowest portion of the first narrow portion 61 in the lateral direction X). The third absorbent portion 55 faces the urine opening of the female pet 2 wearing the absorbent article 10 to function as the main absorbent portion for absorbing the excretion, and thus is preferably relatively wide. Thus, the lengths of the absorbent member 50 are set to satisfy the following relationship: the length W5 of the narrowest portion of the third absorbent portion 55 in the lateral direction X≥the length W3 of the widest portion of the second absorbent portion 54 in the lateral direction X>the length W4 of the narrowest portion of the second absorbent portion 54 (the length of the narrowest portion of the second narrow portion 62 in the lateral direction X).

The absorbent member 50 includes the first and the second narrow portions 61 and 62. Thus, the linkage is interrupted between the first and the third absorbent portions 53 and 55 and the second absorbent portion 54. Thus, the linkage between the first and the third absorbent portions 53 and 55 and the second absorbent portion 54 is reduced, compared with a case where both side edges 50c have continuous curved shape connecting the inner ends 53a and 55a of the first and the third absorbent portions 53 and 55 to both end edges 60a of the center portion 54a, as indicated by a virtual line 64 in FIG. 7.

Generally, a diaper (absorbent article) for a pet of this type includes an absorbent member with both absorbent side edges continuously extending linearly or while being curved. When a pet wearing the diaper walks or makes the other like movement, the entire absorbent member is linked to the forward and backward movement of the hind legs. Thus, the diaper might be displaced, or a facing area having a relatively large width and faces the urine opening might move into a movable range of the hind legs to prevent the walking. The pet in particular is more likely to stop walking upon feeling uncomfortable when the movement of the hind legs is prevented, compared with humans. Both absorbent side edges may have a curved shape conforming to the hind legs. In this configuration, when the absorbent member is pulled toward the belly (or the back) and moves toward the belly side (back side) as a whole under the movement of the pet, the movement might be prevented by the back side portions (or the belly side portions) of both absorbent side edges. The absorbent member may be partially cut over the entire length in the lateral direction to reduce the linkage of the absorbent member as a whole. In this configuration, the diffusibility of the excretion might be prevented (for example, the diffusibility of the excretion from the first absorbent portion to the second absorbent portion) to largely inhibit the absorption efficiency of the absorbent member as a whole.

In the absorbent article 10 according to the present embodiment, the absorbent member 50 has a lower linkage between the first absorbent portion 53 and the second absorbent portion 54 reduced with the first narrow portion 61. Thus, in the belly facing region 11, the first absorbent portion 53 is prevented from being pulled toward the second absorbent portion 54, under the front-and-rear movement of the hind legs 3, whereby there is no risk of preventing the movement. The linkage between the center portion 54a and the third absorbent portion 55 is reduced by the second narrow portion 62. Thus, in a portion of the intermediate region 13 on the side of the second region 17, the third absorbent portion 55 is prevented from being pulled toward the second absorbent portion 54, under the front-and-rear movement of the hind legs 3, whereby there is no risk of preventing the movement. Even when part of the absorbent member 50 moves under the movement of the hind legs 3 of the pet 2, the other portion of the absorbent member 50 may be prevented from moving in a linked manner. Thus, the absorbent member 50 as a whole, and the absorbent article 10 as a whole may be prevented from displacing with respect to the absorbent article 10, whereby the absorbent article 10 may be maintained in a fit state. The absorbent member 50 is continuously formed in the narrow portions 61 and 62, whereby the diffusibility of the excretion may be maintained so that the absorbing performance may be prevented from largely degrading.

The width W2 of the first narrow portion 61 is preferably set to be short so that the linkage of the absorbent member 50 in the longitudinal direction Y is reduced. Specifically, the width W2 is preferably about 20 to 50% of the width W1 of the first absorbent portion 53. The second narrow portion 62 preferably has the smallest possible width W4 in the second narrow portion 62. More specifically, the width W4 is likely to be about 20 to 50% of the width W5 of the third absorbent portion 55. This is because when the width is larger than 50%, transmission of the movement at both side edges of the absorbent member 50 may not be prevented, and when the width is smaller than 20%, the excretion absorbed in the first and the third absorbent portions 53 and 55 is difficult to spread to the second absorbent portion 54. The second absorbent portion 54 preferably has the width W3 in the widest portion that is about twice as long as the widths W2 and W4 of the widest portions, to sufficiently function as the sub-absorbent portion. The level of narrowing at the first and the second narrow portions 61 and 62 or the widths W2 and W4 of the narrowest portions may be freely set. Preferably, the width W2 of the narrowest portion of the first narrow portion 61 is larger than the width W4 of the narrowest portion of the second narrow portion 62 so that the excretion such as urine absorbed in the first absorbent portion 53 may easily spread.

As described above, the absorbent member 50 includes the first and the second narrow portions 61 and 62 spaced apart from each other and are opposite to each other in the longitudinal direction Y. Thus, the linkage between the first and the third absorbent portions 53 and 55 and the second absorbent portion 54 is reduced. Alternatively, at least one of the first and the second narrow portions 61 and 62 (preferably, only the first narrow portion 61) may be provided to reduce the linkage of the entire absorbent member 50. In the embodiment described above, the first and the second narrow portions 61 and 62 are disposed in the second absorbent portion 54. Alternatively, the first narrow portion 61 may be positioned in the first narrow portion 61, between or in both of the first absorbent portion 53 and the second absorbent portion 54, as long as the present embodiment according to the invention may be implemented. Similarly, the second narrow portion 62 may be positioned in the third absorbent portion 55 or between or in both the second absorbent portion 54 and the third absorbent portion 55.

Figure 9:
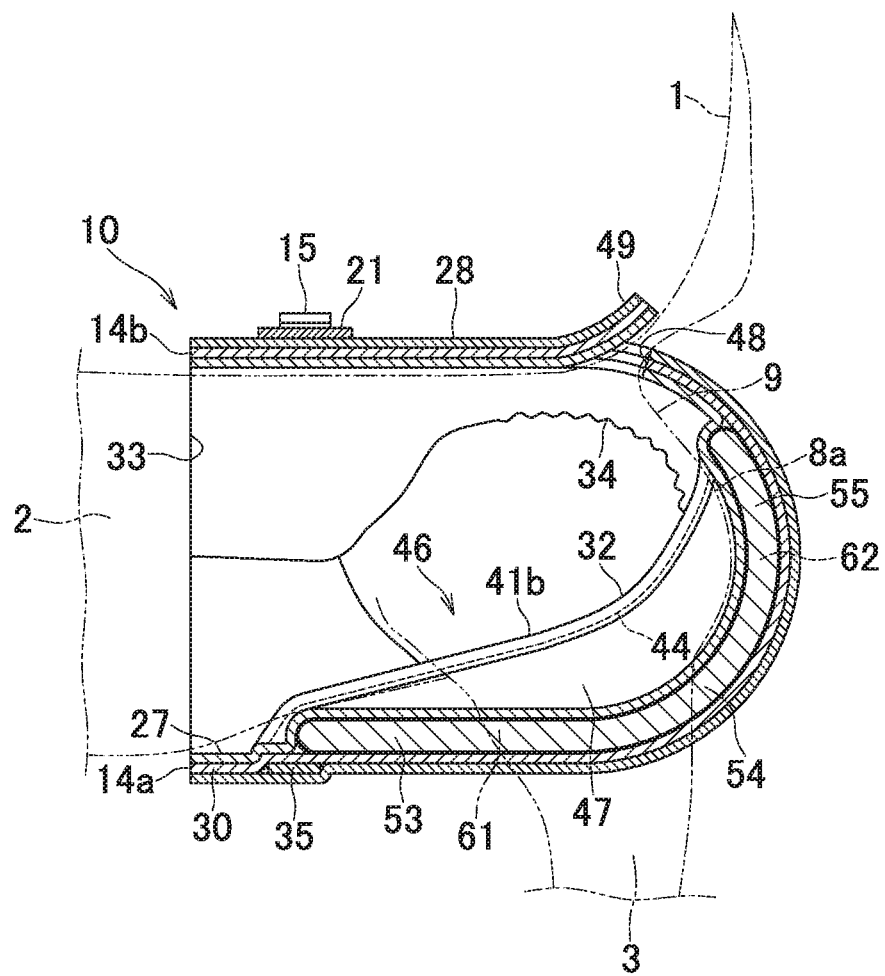
FIG. 9 is a schematic cross-section view of the absorbent article worn by a female pet, taken along the longitudinal center line.

The absorbent article 10 according to the present embodiment is commonly used by male and female. FIG. 9 is a figure similar to FIG. 8 illustrating a state where the female pet 2 is wearing the absorbent article 10 described above. As illustrated in FIG. 9, in the absorbent article 10 used for the female pet 2, the third absorbent portion 55 faces the urine opening 8a of the female pet 2, and the second absorbent portion 54 functions as the sub-absorbent portion to which the excretion spreads.

Figure 10:
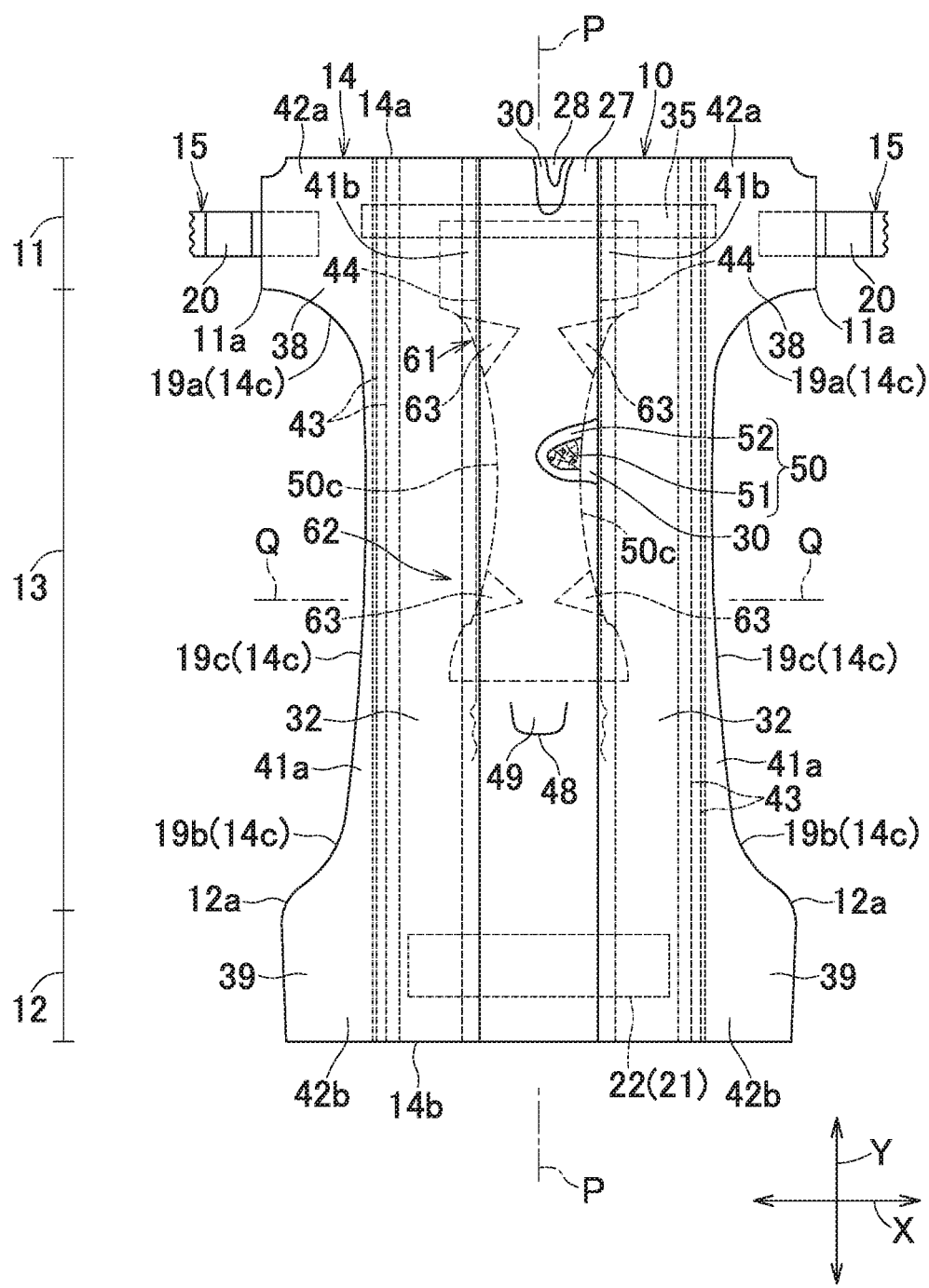
FIG. 10 is a partially cutaway development plan view, similar to FIG. 2, illustrating a modification of the absorbent article according to the first embodiment.

FIG. 10 is a partially cutout plan view illustrating an absorbent member 50 in one exemplary modification of the absorbent article 10. In the present modification, the core wrap sheet 52, defining the contour shape of the absorbent member 50, has both side edges 50c continuously extending while being curved. An absorbent core 51 wrapped has a shape including the first and the second narrow portions 61 and 62. In such a configuration, no core areas 63 including no absorbent core 51 and including the core wrap sheet 52 only are formed on both sides of portions corresponding to the first and the second narrow portions 61 and 62 of the absorbent core 51. The no core area 63 includes no absorbent core 51, and thus is less rigid than an area with the absorbent core 51 (a portion of the absorbent member 50 excluding the no core areas 63).

In this configuration, both side edges 50c of the absorbent member 50 continuously extend in the longitudinal direction Y while being slightly curved by the core wrap sheet 52. Still, the no core areas 63 are provided to cause the change in rigidity whereby the linkage between the first and the third absorbent portions 53 and 55 and the second absorbent portion 54 is reduced.

Figure 11:
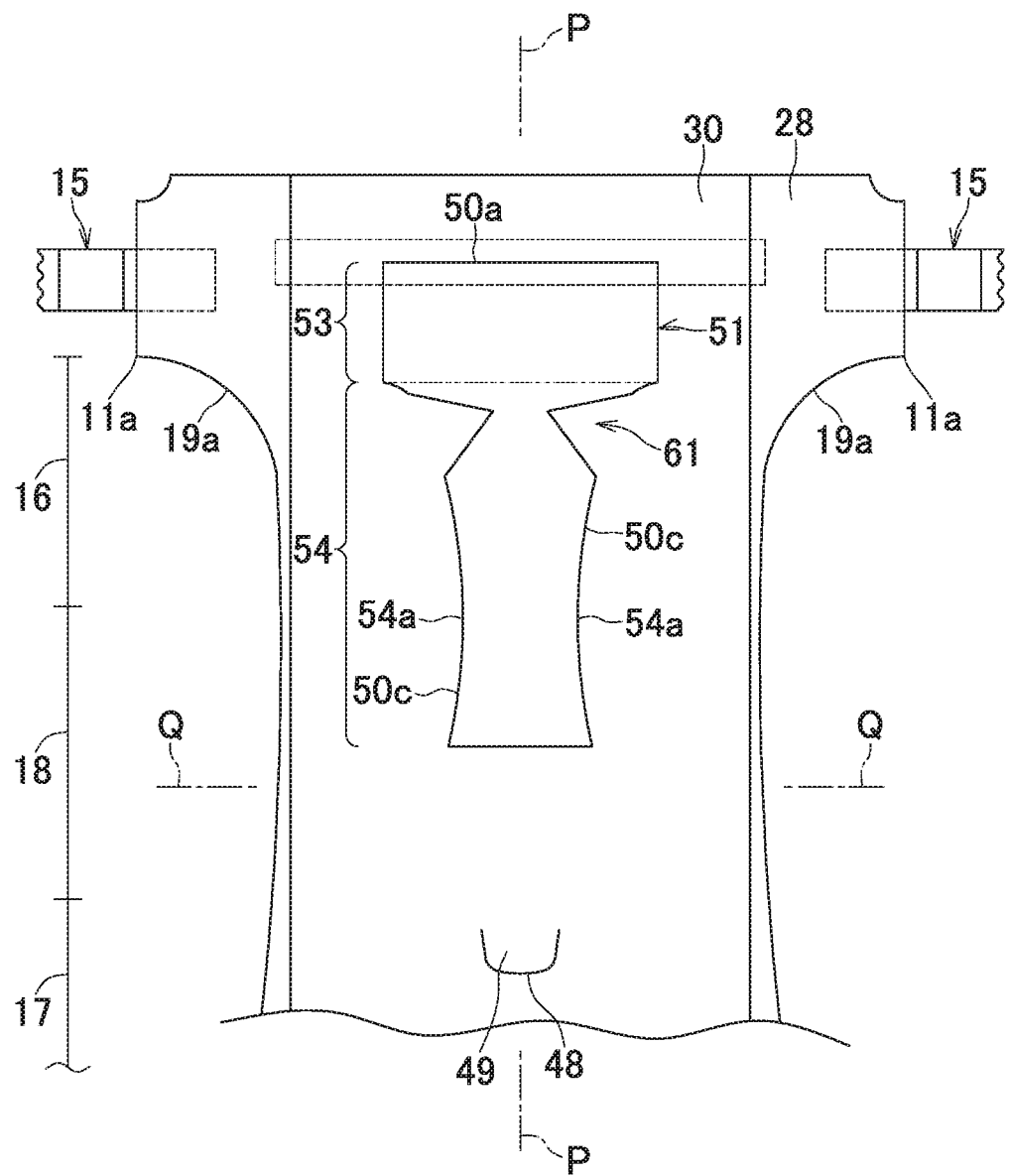
FIG. 11 is a schematic cross-section view, similar to FIG. 7, illustrating an absorbent article for pets according to a modification of the present invention.
Figure 12:
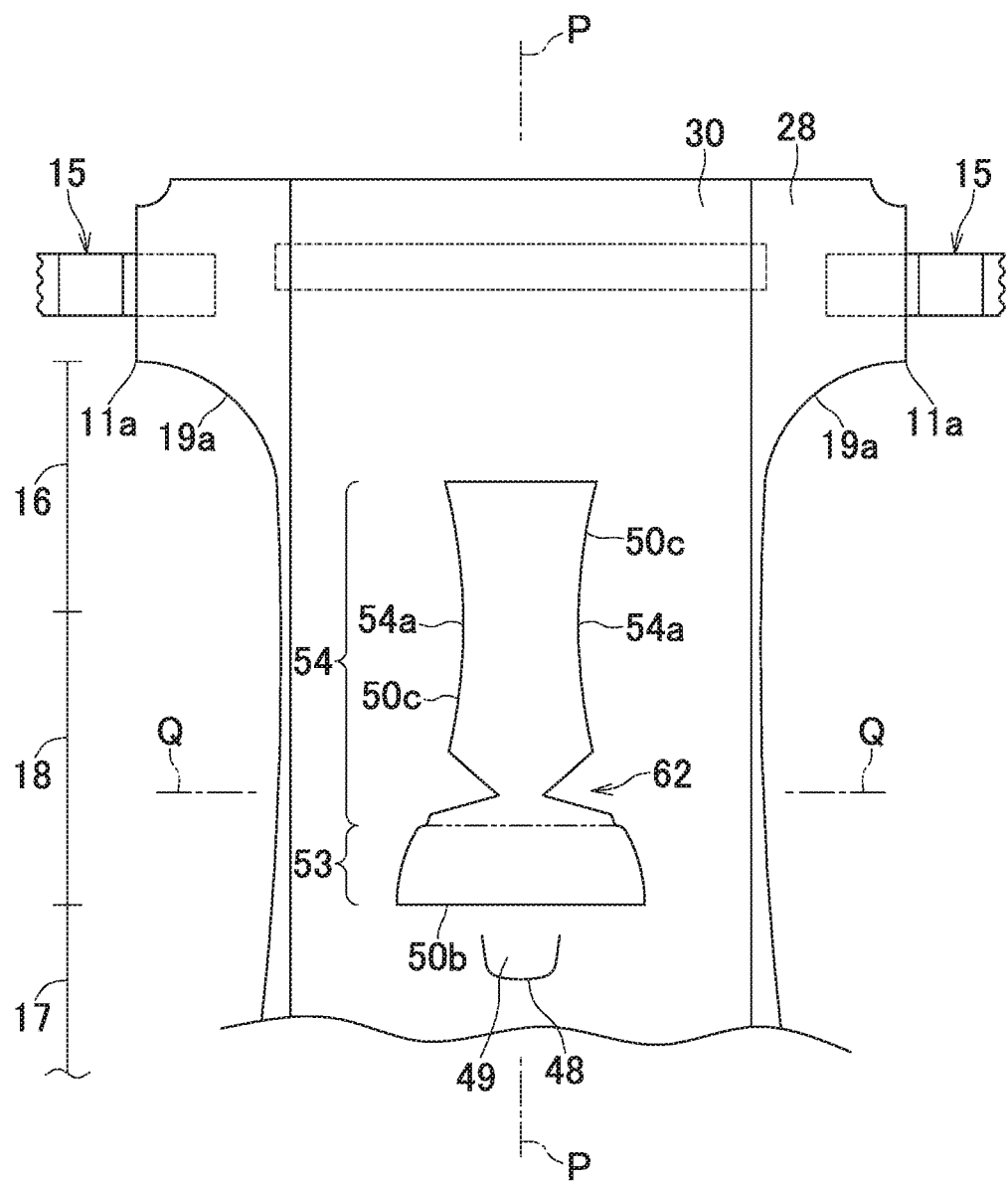
FIG. 12 is a schematic cross-section view, similar to FIG. 7, illustrating an absorbent article for pets according to another modification of the present invention.
Figure 13:
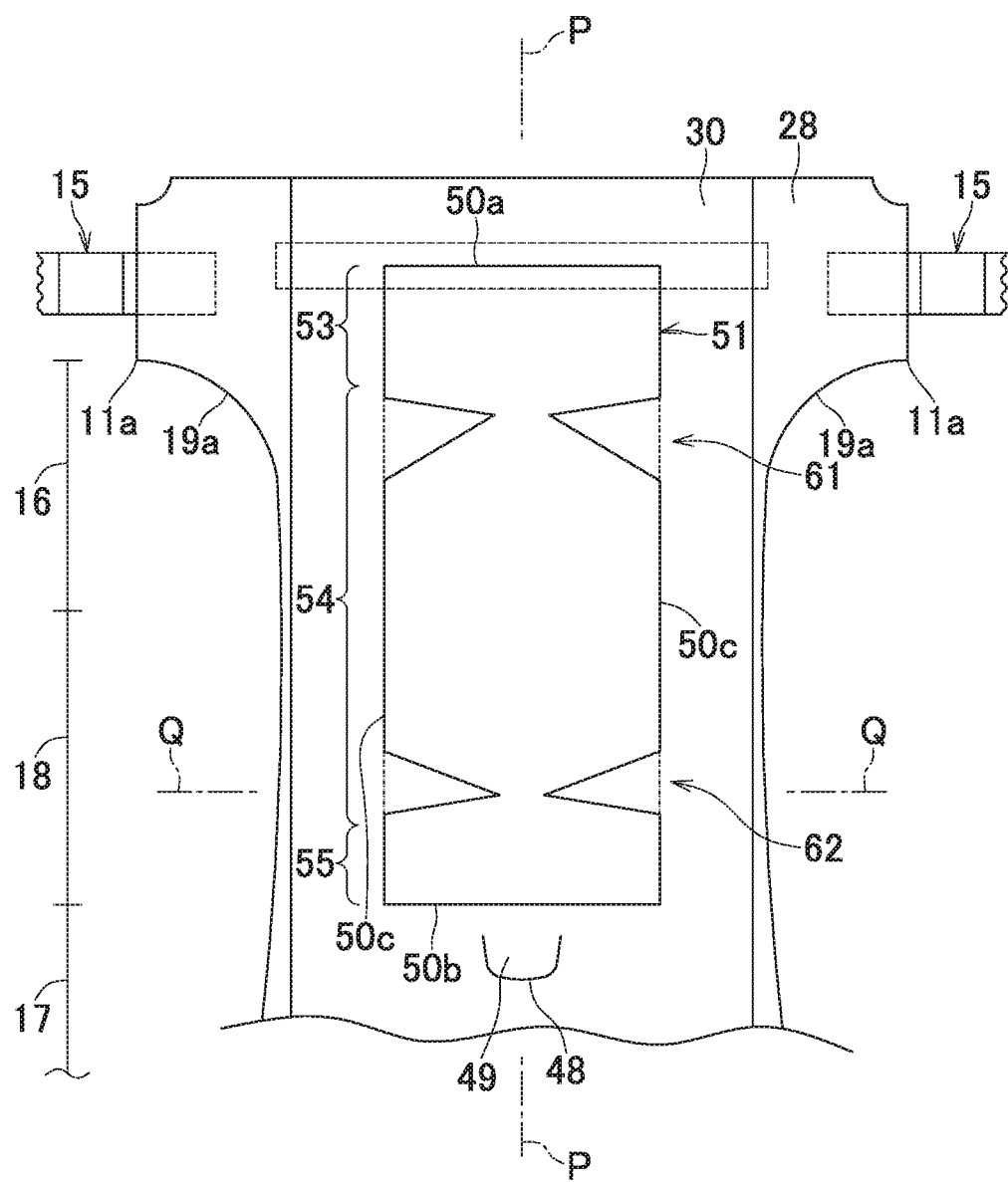
FIG. 13 is a schematic cross-section view, similar to FIG. 7, illustrating an absorbent article for pets according to still another modification of the present invention.

FIG. 11 to FIG. 13 are each a schematic plan view illustrating another modification of the absorbent article 10 according to the present invention. The absorbent article 10 according to the modification illustrated in FIG. 11 includes the absorbent member 50 for female disposed only in a portion on the side of the belly facing region 11 of the lateral center line Q. More specifically, the absorbent member 50 is not disposed in the center region 18 on the side of the back facing region 12, and only includes: the first absorbent portion 53 disposed in the belly facing region 11 and a portion of the first region on the side of the belly facing region 11; and the second absorbent portion 54 positioned on the side of the belly facing region 11 in relation to the lateral center line Q.

The absorbent article 10 according to the modification illustrated in FIG. 12 includes the absorbent member 50 for female. The absorbent member 50 is not disposed in the belly facing region 11 or a portion of the first region 16 on the side of the belly facing region 11, and only includes: the second absorbent portion 54 crossing the lateral center line Q; and the first absorbent portion 53 positioned closer to the back facing region 12 than the second absorbent portion 54.

The absorbent article 10 according to the modification illustrated in FIG. 13 is the absorbent article 10 commonly used by male and female. The absorbent member 50 of the absorbent article 10 has a generally rectangular shape defined by the first and the second end edges 50a and 50b having a linear form; and both side edges 50c linearly extending in the longitudinal direction Y between the first and the second end edges 50a and 50b. The first narrow portion 61 is disposed in the first region 16 closer to the belly facing region 11 than the lateral center line Q, and the second narrow portion 62 is disposed on the lateral center line Q.

Second Embodiment

Figure 14:
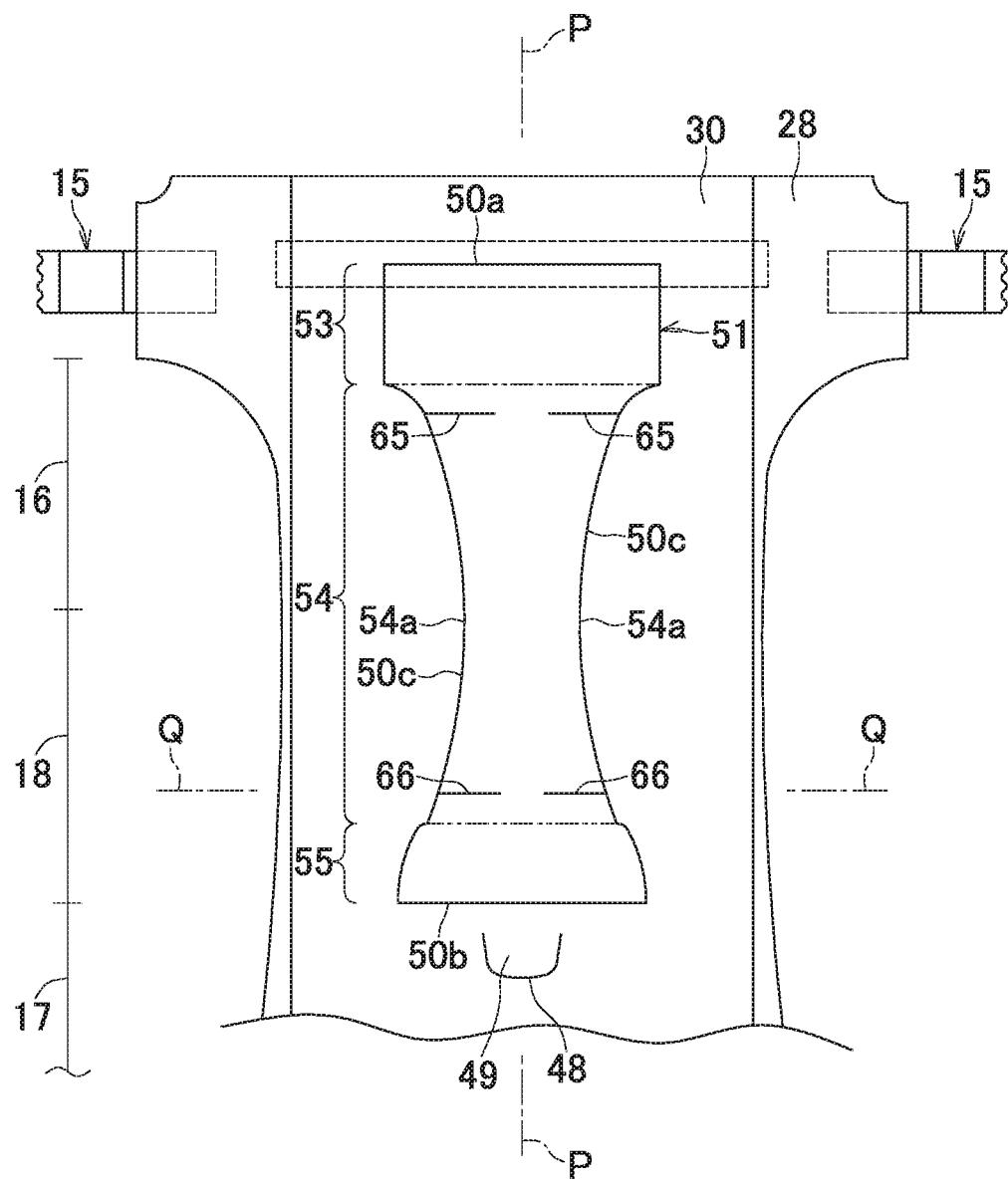
FIG. 14 is a schematic partial plan view, similar to FIG. 7, illustrating an absorbent article for pets according to a second embodiment of the present invention.

FIG. 14 is a diagram similar to FIG. 7 illustrating an absorbent article 10 according to a second embodiment, which is different from the absorbent article 10 according to the first embodiment in the following points but has the other basic configuration that is the same as that in the first embodiment.

In the present embodiment, the second absorbent portion 54 has the side of the first absorbent portion 53 and the side of the third absorbent portion 55 provided with a pair of first and second slits (first and second interruption portion) 65 and 66 spaced apart from each other and are opposite to each other in the lateral direction X in such a manner as to be symmetrical about the longitudinal center line P. With the first and the second slits 65 and 66, the transmission of force at both side edges 50c of the absorbent member 50 is interrupted, whereby the linkage over the entire area is reduced. Thus, there is no risk of the displacement of the absorbent member preventing the movement of the hind legs 3, as in the first embodiment. The core wrap sheet 52 may be in the portions of the absorbent core 51 where the first and the second slits 65 and 66 are formed, as long as the same technical effect may be obtained. Although not elaborated in the figure, the absorbent article dedicated for male does not need the third absorbent portion 55 or the second slit 66 and the absorbent article dedicated for female does not need the first absorbent portion 53 or the first slit 65, as in the absorbent article 10 according to the first embodiment. The absorbent article 10 may have any appropriate combination between the narrowed portions 61 and 62 in the first embodiment and the slits 65 and 66 in the second embodiment. For example, the absorbent article may have the first interruption portion provided with the first narrow portion 61 and the second interruption portion provided with the second slit 66, or may have the first interruption portion provided with the first slit 65 and the second interruption portion provided with the second narrow portion 62.

In addition to the materials described herein, any known material usually used in this technical field may be used for the members included in the absorbent article 10 with no limitation unless otherwise specified. Such terms as "first" and "second" as used herein are merely used for distinguishing like elements, positions, or the like from one another.

The disclosure give above relating to the present invention may be at least arranged as follows:

An absorbent article for a pet has a longitudinal direction and a lateral direction orthogonal to the longitudinal direction and includes: a belly facing region; a back facing region; an intermediate region positioned between the belly facing region and the back facing region in the longitudinal direction; and an absorbent member including an absorbent core, the absorbent member is only disposed in a portion closer to the belly facing region than a cut line in which a tail of the pet is inserted, and includes: both side edges opposite to each other in the lateral direction; a first absorbent portion facing a urine opening of the pet; and a second absorbent portion facing a portion outside the urine opening, and the absorbent core includes an interruption portion configured to interrupt linkage between the first absorbent portion and the second absorbent portion in the longitudinal direction.

The present invention disclosed in paragraph 0043 may at least include the following embodiments. These embodiments may be taken in isolation or in combination.

(1) The absorbent article further has a longitudinal center line bisecting a length in the lateral direction and extend in the longitudinal direction, and the interruption portion extends toward the longitudinal center line from side edges.

(2) The interruption portion is an area without the absorbent core.

(3) The absorbent article further has a lateral center line bisecting a length in the longitudinal direction and extends in the lateral direction, the absorbent member further includes a first end edge and a second end edge opposite to each other in the longitudinal direction, and the interruption portion is at a portion where the length in the lateral direction gradually decreases from the first or the second end edge toward the lateral center line.

(4) The absorbent member further includes a third absorbent portion spaced apart from and is opposite to the first absorbent portion in the longitudinal direction and faces a urine opening of the pet which is a male or a female, and the second absorbent portion is positioned between the first absorbent portion and the third absorbent portion.

(5) The intermediate region includes: a first region positioned on a side of the belly facing region; a second region positioned on a side of the back facing region; and a center region positioned between the first and the second regions, the intermediate region has both side edges each provided with a narrow portion in the first region, the narrow portion being gradually narrowed inward in the lateral direction from inner ends of the belly facing region, and the interruption portion is disposed between a pair of the narrow portions in the lateral direction.

The invention claimed is:

1. An absorbent article for a pet, the article having a longitudinal direction and a lateral direction orthogonal to the longitudinal direction and comprising:
   a belly facing region;
   a back facing region;
   an intermediate region positioned between the belly facing region and the back facing region in the longitudinal direction; and
   an absorbent member,
   wherein the absorbent member is only disposed in a portion closer to the belly facing region than a cut line configured for a tail of the pet to be inserted, wherein the absorbent member includes:
two side edges opposite to each other in the lateral direction;
a first absorbent portion configured to face an urine opening of the pet; and
a second absorbent portion configured to face a portion outside the urine opening, and
an interruption portion configured to interrupt linkage between the first absorbent portion and the second absorbent portion in the longitudinal direction, and
wherein each of the side edges of the absorbent member includes a first portion and two second portions at opposite ends of the first portion,
the first portion curving, from the opposite ends thereof, toward the other side edge in the lateral direction, and
the second portions extending inward, from the opposite ends of the first portion, toward the other side edge in the lateral direction to define the interruption portion.

2. The absorbent article according to claim 1,
wherein the absorbent article further has a longitudinal center line bisecting a width of the absorbent article in the lateral direction and extending in the longitudinal direction, and
wherein the interruption portion extends toward the longitudinal center line from the side edges of the absorbent member.

3. The absorbent article according to claim 2, wherein the absorbent member includes an absorbent core in the first and second absorbent portions, and
the interruption portion is an area without the absorbent core.

4. The absorbent article according to claim 1,
wherein the absorbent article further has a lateral center line bisecting a length of the absorbent article in the longitudinal direction and extending in the lateral direction,
wherein the absorbent member further includes a first end edge and a second end edge opposite to each other in the longitudinal direction, and
wherein the interruption portion is at a portion where a width of the absorbent article in the lateral direction gradually decreases from the first or the second end edge toward the lateral center line.

5. The absorbent article according to claim 1,
wherein the absorbent member further includes a third absorbent portion spaced apart from and opposite to the first absorbent portion in the longitudinal direction
wherein the third absorbent portion is configured to face an urine opening of a pet which is a male or a female, and
wherein the second absorbent portion is positioned between the first absorbent portion and the third absorbent portion.

6. The absorbent article according to claim 1,
wherein the belly facing region has inner ends opposite to each other in the lateral direction,
wherein the intermediate region includes:
a first region positioned on a side of the belly facing region;
a second region positioned on a side of the back facing region; and
a third region positioned between the first and the second regions,
wherein the interruption portion is provided in the first region and has a pair of narrow portions being gradually narrowed inward in the lateral direction from the inner ends of the belly facing region, and
wherein the pair of narrow portions are opposite to each other in the lateral direction.

* * * * *